(12) United States Patent
Thangam et al.

(10) Patent No.: US 11,366,664 B1
(45) Date of Patent: Jun. 21, 2022

(54) SINGLE INSTRUCTION MULTIPLE DATA (SIMD) EXECUTION WITH VARIABLE WIDTH REGISTERS

(71) Applicant: Blaize, Inc., El Dorado Hills, CA (US)

(72) Inventors: Kamaraj Thangam, Hyderabad (IN); Srinivasulu Nagisetty, Hyderabad (IN); Venkata Divya Bharathi Palaparthy, Hyderabad (IN); Aswathy Asok, Hyderabad (IN); Satyaki Koneru, Folsom, CA (US)

(73) Assignee: Blaize, Inc., El Dorado Hills, CA (US)

( * ) Notice: Subject to any disclaimer, the term of this patent is extended or adjusted under 35 U.S.C. 154(b) by 0 days.

(21) Appl. No.: 16/706,753

(22) Filed: Dec. 8, 2019

(51) Int. Cl.
*G06F 9/30* (2018.01)
*G06F 9/38* (2018.01)
*G06F 9/48* (2006.01)

(52) U.S. Cl.
CPC .......... *G06F 9/3012* (2013.01); *G06F 9/3802* (2013.01); *G06F 9/3836* (2013.01); *G06F 9/3851* (2013.01); *G06F 9/4843* (2013.01)

(58) Field of Classification Search
CPC .............................. G06F 9/3836; G06F 9/3851
See application file for complete search history.

(56) References Cited

U.S. PATENT DOCUMENTS

| | | | |
|---|---|---|---|
| 7,140,019 B2 | 11/2006 | May et al. | |
| 7,856,544 B2 | 12/2010 | Schenfeld et al. | |
| 8,291,006 B2 | 10/2012 | Andrade et al. | |
| 9,367,658 B2 | 6/2016 | Pell et al. | |
| 9,606,797 B2 * | 3/2017 | Vaidya | G06F 9/3887 |
| 2010/0274993 A1 * | 10/2010 | Golla | G06F 9/30109 712/216 |
| 2011/0289507 A1 | 11/2011 | Khan et al. | |
| 2013/0036409 A1 | 2/2013 | Auerbach et al. | |
| 2013/0042090 A1 * | 2/2013 | Krashinsky | G06F 9/3887 712/214 |
| 2014/0122840 A1 * | 5/2014 | Abernathy | G06F 9/30101 712/225 |
| 2014/0130023 A1 | 5/2014 | Chen et al. | |
| 2014/0164737 A1 * | 6/2014 | Collange | G06F 9/30058 712/205 |
| 2014/0176588 A1 | 6/2014 | Dulak, Jr. et al. | |
| 2020/0202605 A1 * | 6/2020 | Saleh | G06T 7/90 |
| 2020/0319923 A1 * | 10/2020 | Ro | G06F 9/30047 |

OTHER PUBLICATIONS

Nicolas Brunie, Sylvain Collange, Gregory Diamos. "Simultaneous Branch and Warp Interweaving for Sustained GPU Performance" IEEE 2012. (Year: 2012).*

* cited by examiner

*Primary Examiner* — Jacob Petranek
(74) *Attorney, Agent, or Firm* — Brian R. Short

(57) ABSTRACT

Systems, apparatuses and methods are disclosed for efficient management of registers in a graph stream processing (GSP) system. The GSP system includes a thread scheduler module operative to initiate a Single Instruction Multiple Data (SIMD) thread, the SIMD thread including a dispatch mask with an initial value. A thread arbiter module operative to select an instruction from the instructions and provide the instruction to each of one or more compute resources, and an instruction iterator module, associated with the each of one or more compute resources operative to determine a data type of the instruction. The instruction iterator module iteratively executes the instruction based on the data type and the dispatch mask.

19 Claims, 7 Drawing Sheets

200 mR0-8 bit                mR1-32 bit 300A                       300B

SINGLE INSTRUCTION MULTIPLE DATA (SIMD) EXECUTION WITH VARIABLE WIDTH REGISTERS

FIELD OF EMBODIMENTS

The described embodiments relate generally to registers in graph stream processing systems. More particularly, the described embodiments relate to systems and methods for efficient use of logical registers in graph stream processing systems.

BACKGROUND

The onset of computation heavy applications is causing a paradigm shift from centralized computing to parallel and distributed computing. Parallel computing includes distributing computing jobs to the various compute resources. These resources generally include several central processing units (CPU), memory, storage, and support for networking.

Centralized computing works well in many applications but falls short in the execution of computation rich applications, which are increasingly popular. Programs can be executed in a serial fashion or distributed to be executed on multiple processors. When programs are executed in a serial fashion, only one processor can be utilized and hence the throughput is limited to the speed of the processor. Such systems with one processor are adequate for many applications but not for compute intensive applications. Code can be executed in parallel in graph stream processing systems leading to higher throughput. Graph stream processing systems entail breaking of code into smaller code blocks and efficiently managing the execution of code. In order for the processors to execute in parallel, data to each of the processors must be independent. Instances of a same code block can be executed on several processors simultaneously to improve the throughput. Computing different data types requires different register widths. When the register width is fixed, either multiple clock cycles are needed to load the registers, or the register must be wide to hold the largest data type. This leads to inefficiency in the system.

It is desirable to have a method, apparatus and system for efficiently managing different data types in a graph stream processing.

SUMMARY

One embodiment includes a system and method of processing comprising initiating a Single Instruction Multiple Data (SIMD) thread by a thread scheduler. The SIMD thread includes an initial value of a dispatch mask. The method further comprises a thread arbiter module providing an instruction of the instructions fetched from memory to one or more compute resources. An instruction iterator is associated with each compute resources. The instruction iterator iteratively executes instruction based on the data type and the dispatch mask.

DETAILED DESCRIPTION

The described embodiments are embodied in methods, apparatuses and systems for efficient management of logical registers in a graph stream processor system.

Figure 1:
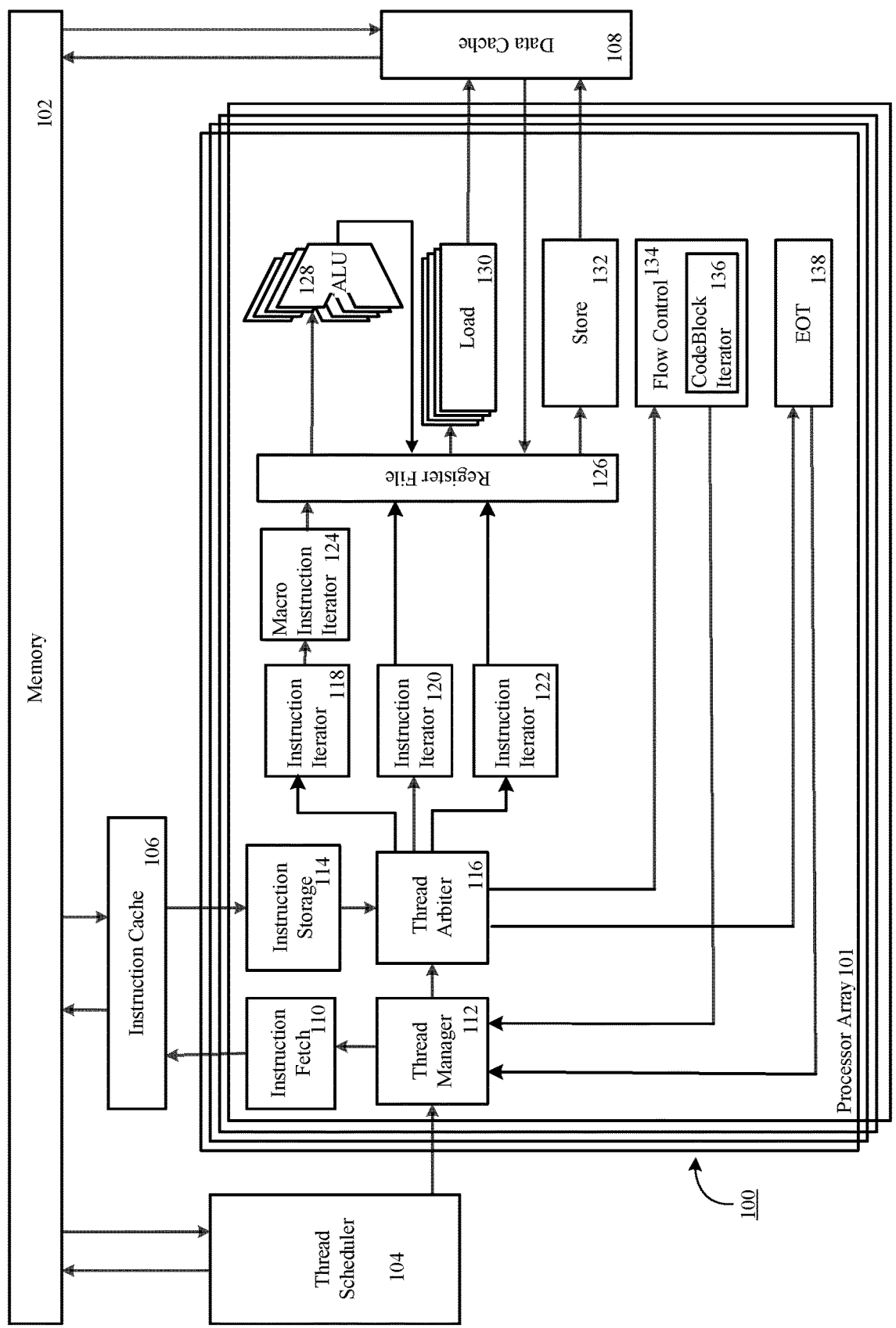
FIG. 1 shows a block diagram of an embodiment of a graph streaming processor system utilizing logical registers.

FIG. 1 shows a GSP Graph Stream processor (GSP) 100, according to an embodiment. For an embodiment, the GSP 100 includes processor array 101, memory 102, thread scheduler module 104, instruction cache 106, and data cache 108.

Processor array 101 comprises one or more processors. In an example, the processor array could comprise 4 processors of Single Instruction Multiple Data (SIMD) type.

Memory 102 comprises memory where software places all the buffers that are required for execution of the GSP. Memory 102 stores both instruction and data. Memory 102 includes the command and data buffers in addition to other buffers. In an embodiment, memory 102 can be any of First-in-First-out (FIFO) buffers, DRAM, MRAM or SRAM.

Thread Scheduler module 104 comprises a series of identical stages each of which can check on the availability of resources for running a thread (thread slot, registers, etc.) across an array of processors and dispatching the thread. Execution of an acyclic graph with multiple nodes is carried out by depth-wise mapping of the nodes to the stages. The commands to schedule threads are held in command buffers which are written into by a stage and read from by the next stage. Each SIMD thread is associated with a thread ID. In the described embodiments, thread ID and SIMD thread ID are used interchangeably. The SIMD thread comprises a dispatch mask. A dispatch mask holds the status of a SIMD channel. One bit is required to store the status of each SIMD channel. hence one register bit per SIMD channel is required. In a SIMD system, multiple data are operated on at any given time. Each of the data being operated on is associated with an independent thread which is also referred to as channel.

Dispatch mask is stored in thread manager 112. The dispatch mask has the same size as SIMD width. In the described embodiments, a SIMD width is the number of data bits that the h/w can operate on with a single instruction. For example, a system with a SIMD width 64 has a dispatch mask width of 64. The thread scheduler module 104 initiates the SIMD thread with an initial dispatch mask.

Stage and other related details such as threads are described later with respect to FIG. 6. Instruction cache 106 is a read-only cache for servicing the instruction cache-line fetch requests from the threads running on the processor array. Data cache 108 receives data from memory 102 and load module 130. Data cache 108 can write back to memory as well as update register file 126. Processor array 101 comprises of modules instruction fetch module 110, thread manager 112, instruction storage module 114, thread arbiter module 116, instruction iterator 118, 120 and 122, macro instruction iterator 124, register file 126, ALU 128, load 130, store 132, flow control 134, code block iterator 136, and EOT 138.

Instruction fetch module 110 initiates the fetch of a cache-line (64 Bytes) of instructions from memory 102 via the instruction cache 106. Thread manager 112 holds the state associated with each thread. This includes the initial information at thread dispatch mask, thread ID, pointer, and the state generated during execution of the thread.

Each thread has 2 cache-line slots that enables the fetch of a second cache-line when the first cache-line is returned by the instruction cache. The first cache line is stored in instruction storage module 114 when the second cache line is being fetched. Thus, the execution of one cache-line worth of instructions overlaps with the fetch of the second cache-line of instructions.

The availability of instructions and the absence of any dependency on prior instructions pending completion of execution make a thread a candidate for scheduling instructions into the different execution compute resources. The thread arbiter module 116 is responsible for fair scheduling of instructions into each of the compute resources such as load 130, store 132, flow control 134.

Each compute resource (ALU 128, load 130, store 132) is associated with an instruction iterator (118, 120, 122). Instruction iterator determines the data type required for each instruction.

In the described embodiment, data type, refers to a classification that specifies which type of value a variable has and the type of mathematical, relational or logical operations can be applied to it. Data types include the storage classifications like integers, floating point values, strings, characters etc. Storage of each data type can be different, which is also referred to as data width. For example, integer could need 32 bits wide while character data type could need 8 bits wide.

The instruction iterator is responsible for sub-cycling each SIMD instruction for as many phases as are required to complete the processing of the instruction. Multiple phases would be required because of a narrower register file and/or an execution pipeline than the instruction SIMD width i.e. the data read out of the register file and/or the width of the execution pipeline is less than the instruction SIMD width. Multiple phase execution or iterative execution depends on the dispatch mask and the data type. Instruction iterator determines the number of clock phases required for execution of an instruction based on the data type and dispatch mask.

Macro instruction iterator 124 module is responsible for handling the Sum-of-Multiply-Accumulate (SOMAC) instructions with an instruction size. It controls the sequencing of the first source operand read and its zero-detection, the second source operand read and its zero 08, and the destination operand read and update.

Source and destination operands for each instruction are stored in register file 126. All operations carried out by the processor are on registers in register file 126. Data can be loaded from memory 102 into the register file 126 while data can be stored in memory 102 from the register file 126. Register file width is same as channel width.

The processor array 101 holds a number of compute resources for performing the various operations needed in the execution of code. These include the math computes, accesses from and to memory, conditional operations and thread termination. There are also multiple instances of these modules based on the throughput requirements for each of the operations. ALU 128 is responsible for performing all the math operations including add/subtract/multiply/divide, compares, bit-wise logical operations and data movement. In an embodiment ALU 128 is an array of 4 ALUs. Load 130 issues instructions to data cache 108 to fetch data from memory 102 and write into register file 126. Store 132 is used for sending the results in register file 126 to memory 102. The compute resource width is the same as register file width. Register file width may or may not be same as SIMD width. Compute resource width is generally narrower than SIMD width.

Flow Control 134 handles all conditional statements such as IF/ELSE/ENDIF, WHILE, ENDLOOP, BREAK, CONTINUE etc. Code Block Iterator 136 is a part of the flow-control pipeline and services the WALK/ENDWALK instructions. End Of Thread (EOT) 138 handles the thread termination command and releases all resources occupied by the thread in the processor.

Figure 2:
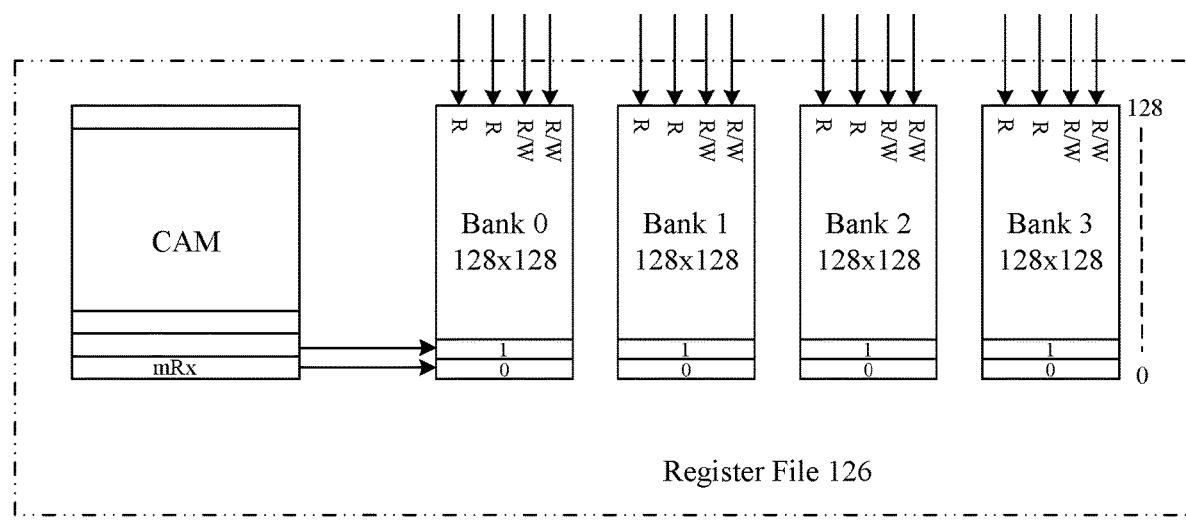
FIG. 2 shows a block diagram of an embodiment of a register file implementation in a graph streaming processor system.

Attention is now drawn to FIG. 2, an implementation of a register file in a graph streaming processor system 200. Graph Streaming processor (GSP) is a multi-threaded SIMD machine and the compute pipe in GSP supports many data formats such as 8 bits, 16 bits, 32 bits, 64 bits and 128 bits.

Kernel register data for operation and results are temporarily stored in register file 126. In an embodiment, register file can comprise of Multi-data Random Access Memory (MRAM). MRAM is shared across multiple threads. Each thread has an associated thread ID. In an embodiment, MRAM comprises of a Content Addressable Memory (CAM) and at least four banks of SRAMs. Each bank is a 128×128 Static Random-Access Memory (SRAM). Each entry in the MRAM is 512 bits, which is the physical size of a register in GSP. One MRAM has 128 registers and its shared across 8 threads in GSP. The CAM maps the kernel logical registers to physical registers. Software use the same logical register in different threads which run concurrently.

CAM stores thread ID, register number and sub-register number to map logical register to the physical register. When a processor writes SIMD data into a register of the register file, the CAM stores the logical register number, logical sub-register number and thread ID and maps a physical register location.

When the processor requests to read a register of MRAM, requested register number, sub-register number and thread ID is compared across all the entries in CAM and the corresponding output of MRAM which is the physical register is returned.

As explained above each register in GSP is 512 bits, so the number of SIMD channels packed in a register varies depending on the datatype. The SIMD width of an instruction varies with the datatype. A kernel could have variables with different data format, compiler must manage all these different data types. For example, a code with for loops with different data types. In an embodiment an integer type data needs 32 bits of storage, while character type data requires 8 bits.

```
for (int i=0; i<n; i++) {
  for (int j=0; j<m; j++) {
    char A [i][j]=B[i][j]*c[i][j];
    int X[i][j]=Y[i][j]*Z[i][j];
    int O[i][j]=X[i][j]*A[i][j];
  }
}
```

When the complier vectorizes a code as above and creates multiple SIMD threads, SIMD size of the thread is defined. If the SIMD size of the thread can be based on the smallest format in the kernel which is 8 bits, it will be 8×8 (64 channels/512 bits). But the 32-bit instruction ("X=Y*Z")

supports only 16 SIMD channels in each physical register. Hence complier has to replicate the instruction and store the variables in multiple ("four") mR registers.

To avoid the above complexity in the complier, a logical register view is created. Logical register view is datatype agnostic. A logical register "mR" can be of any size example 8×8 or 64×1 or less irrespective of datatype. Hardware internally maps a logical register to multiple physical registers if required by introducing a sub-register number in the CAM.

Figure 3:
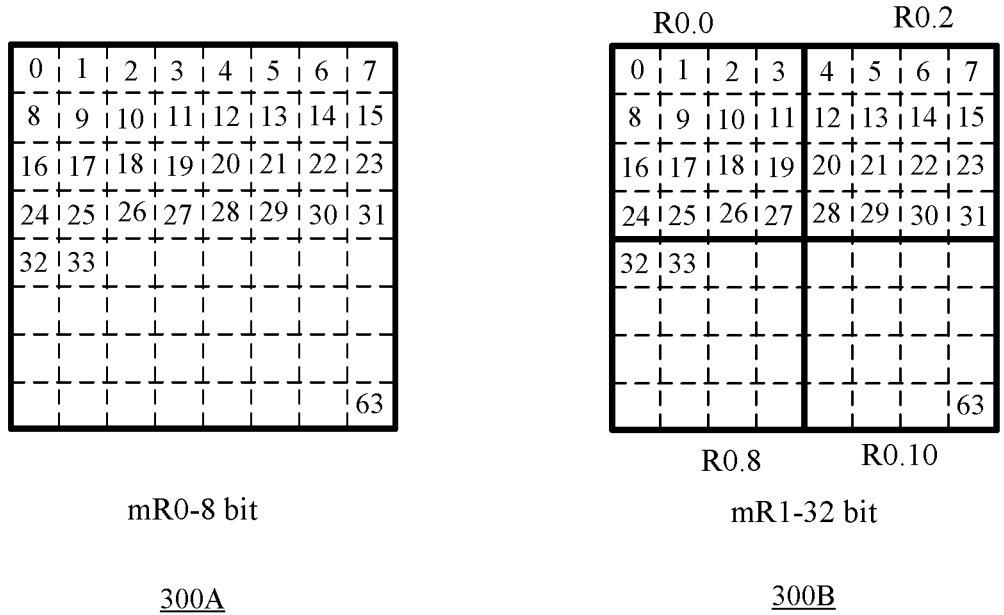
FIG. 3 shows an example mapping of a logical register for 8-bit and 32-bit formats.

FIG. 3 is an example showing the mapping of an 8×8 logical register for 8 bit and 32-bit format.

Figure 4:
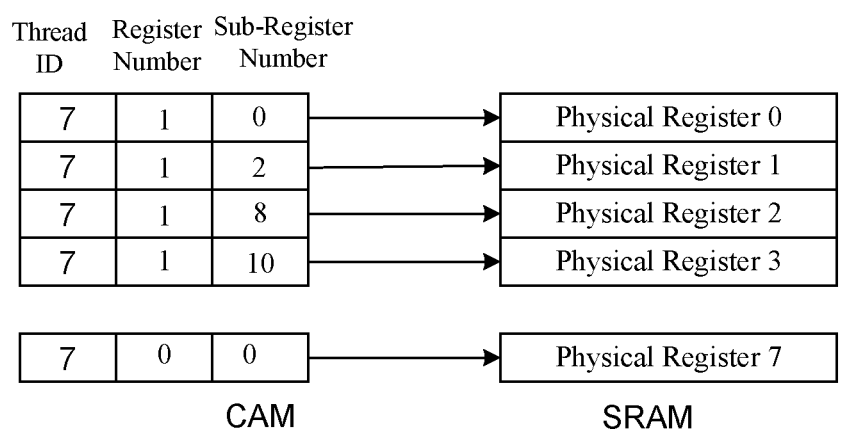
FIG. 4 shows the CAM-physical register mapping in an embodiment of a graph streaming processor system.

FIG. 4 shows the CAM for mapping of logical address to physical address. In the described embodiments, logical address is referred to as the address generated by the processor while the physical address is a location that exists in the memory. CAM comprises of a thread ID, a register number and the sub-register number. Register number in the described example can be 0-3 while sub-register distinguishes the multiple physical registers associated with each logical register based on the data type and SIMD width.

Above mentioned example kernel can be exactly written in assembly like the source code with each thread vectorized to 64 channels.

Thread size: 8×8.
LOAD.u8 mR0 IB[0]; //B
LOAD.u8 mR0 IB[1]; //C
LOAD.u32 mR0 IB[2]; //Y
LOAD.u32 mR0 IB[3]; //Z
MUL.u8 mR0 mR1 mR2 with upconvert.1; //A=B*C
MUL.u132 mR3 mR4 mR5; //X=Y*Z
MUL.u32 mR6 mR0 mR3; //o=X*A
Store.u32 mR6 OB[0];

The compute pipes such as load, store in GSP process a single physical register per instruction. Since each instruction works on a logical register, "MUL.u32 mR3 mR4 mR5" instruction is sub-cycled and executed four times in the compute pipe.

MUL.u32 mR3 mR4 mR5 effectively translates to
MUL.u32 mR3.0 mR4.0 mR5.0
MUL.u32 mR3.2 mR4.2 mR5.2
MUL.u32 mR3.8 mR4.8 mR5.8
MUL.u32 mR3.10 mR4.10 mR5.10 in hardware. The data format and SIMD width of instruction defines the number of clock phases in instruction sub-cycling also referred to as iterative execution. Example: instruction with 32 bit data and 4×4 SIMD size will have a single phase. A maximum of 16 phases of instruction sub-cycling is possible because the maximum data size is 128 bit and the largest thread size is 8×8/64×1, which is 16 physical registers.

| 0  | 1  | 2  | 3  |
|----|----|----|----|
| 4  | 5  | 6  | 7  |
| 8  | 9  | 10 | 11 |
| 12 | 13 | 14 | 15 |

Each physical register in case of 128 bit stores a 2×2 data. For a thread size of "2×4" and 128-bit format, "phase 0" and "phase 4" are executed.

Figure 5:
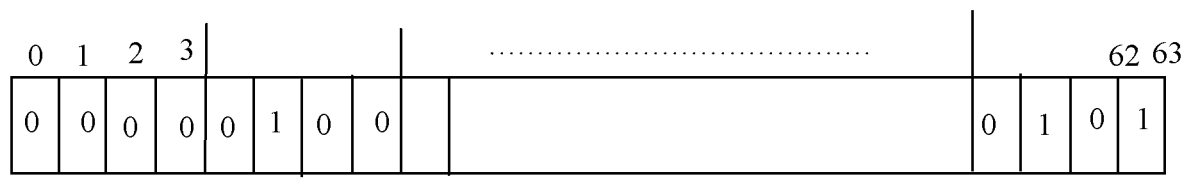
FIG. 5 shows an embodiment of a dispatch mask in graph streaming processor system.

FIG. 5 shows an embodiment of a dispatch mask. In an embodiment, the compute resource can process a subset of data very clock phase when the compute resource width is narrower than the SIMD width. In order to process the entire SIMD instruction, multiple clock phases are required. Each bit in the dispatch mask holds the status of a SIMD channel at an initial point of time. Each bit of the dispatch mask indicates which data channel is enabled or disabled. Instruction iterator selects the channel for processing based on the enabled channel and the walk size. In an example FIG. 5 shows a SIMD width of 64 and a walk size of 4. The instruction iterator searches for an enabled channel in groups of 4 which is the walk size.

Figure 6:
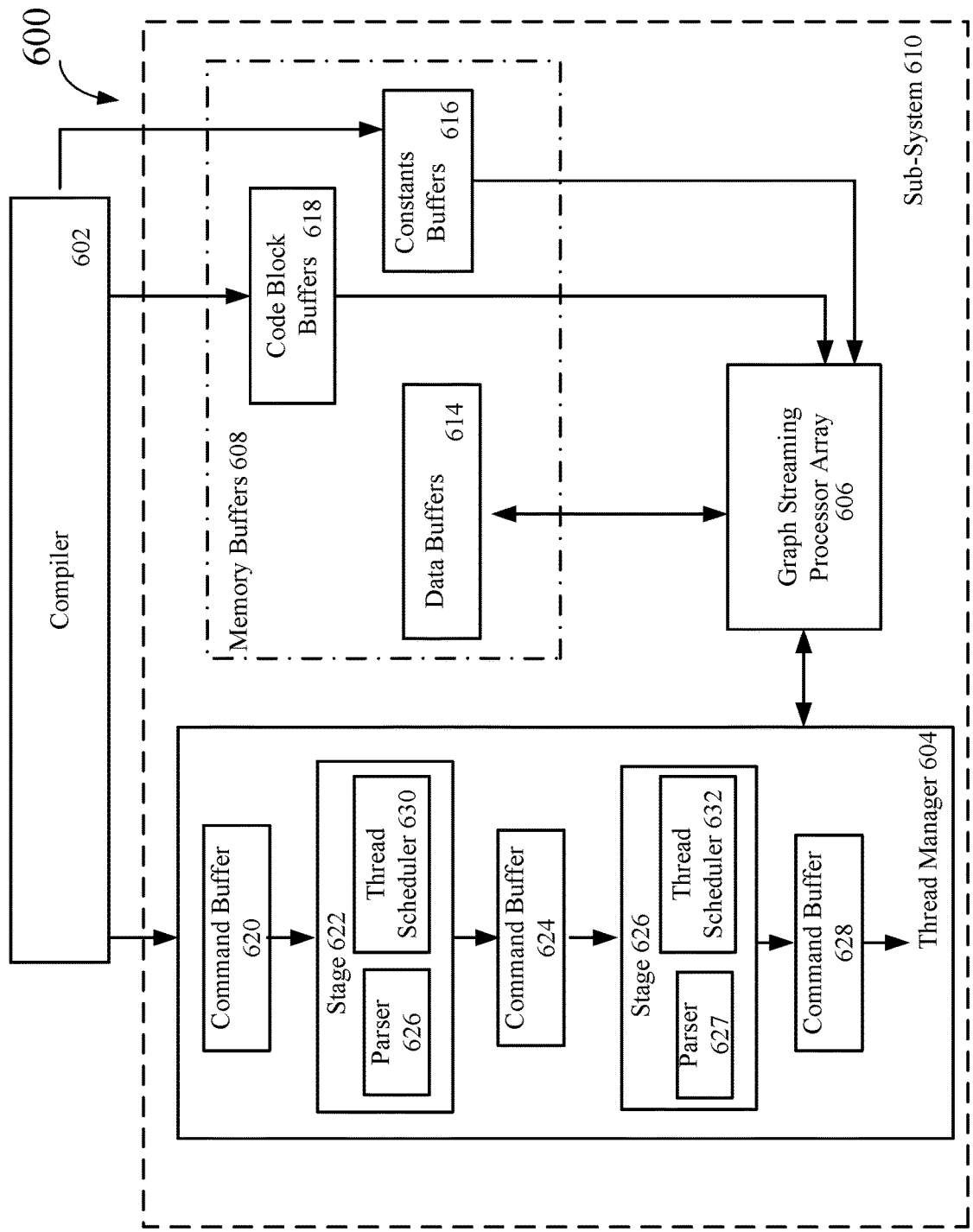
FIG. 6 shows an embodiment of a graph streaming processor system.

FIG. 6 is a schematic diagram illustrating implementations with an example of a GSP system. In an embodiment, system 600 comprises of compiler 602 and sub-system 610. In a non-limiting embodiment, sub-system 610 includes thread manager module 604, graph streaming processor array (GSP) 606, and memory 608.

Compiler 602 segments initial program code into code blocks to enable/optimize task parallelism of the processing. For the described embodiments, block or code blocks refer to a section or portions of code grouped together. Grouping enables groups of statements to be treated as if they were one statement, and to restrict the scope of variables, procedures and functions declared in a block so that they do not conflict with variables having the same name used elsewhere in a program for different purposes. Flow constructs such as if and for loops cannot straddle code blocks. Each of these code-blocks is a set of instructions along with its inputs and outputs. The thread is a code-block which is scheduled for operation on the graph streaming processor array (GSP) 606. Each thread is a physical instance of a set of instructions (kernel/program/code-block) running on a set of data and producing output data. A kernel/program can be a code block of a larger program. For an embodiment, the compiler program splits up the program into code-blocks at points where the vector-ness/width of the code changes to enable/optimize task parallelism. The vector-ness/width indicates the degree of parallel processing.

For an embodiment, thread manager module 604 includes a plurality of stages 622, 626, wherein each of the stages (622, 626) include an interface to an input command buffer (620, 624) and input command buffer parser (626, 627) of the stages (622, 626). Each stage (622, 626) of the graph streaming processor system includes a thread scheduler module (630, 632), a physical piece of hardware in the scheduler module which is responsible for scheduling the threads. The input command buffer parser 626, 627 generates the threads of the stage 622, 626 based upon commands of a command buffer 620, 624 located between the current stage and the previous stage. The command buffers have command written into them that provides parallel processing and trigger threads for later occurring stages.

The plurality of threads run on the graph streaming processor (GSP) array 606. In an embodiment, compiler 602 generates the SIMD thread, thread manager module 604 issues the SIMD thread to GSP array 606. In an embodiment, scheduling of a thread on the processors is based on availability of resources including a thread slot in a GSP 606, adequate space in the register file in the GSP array 606 and in the output command buffer for writing the commands produced by the executing instructions in the GSP array 606.

For an embodiment, the threads running on the processors have instructions embedded by the compiler to spawn/create downstream threads. The execution of these instructions results in commands which are placed in the output command buffer of the stage which in turn becomes the input command buffer for the next (later) stage.

For an embodiment, the locations of the command buffers between the stages and the hardware implementation of the stages allows for substantial performance advantages over software implementations of the command buffers and schedulers (stages).

For an embodiment, a node is a code-block along with the inputs, outputs. A node can be split up into one or more threads with each thread running the same code-block but on different data and producing different data. More than one node can be included within a stage. A graph can provide a visual dependency relationship between the nodes. For an embodiment, a stage is a physical piece of hardware in the scheduler module which is responsible for scheduling the threads corresponding to the node/s at a particular depth (relative timing of the nodes) in the graph. The stage includes an input command buffer parser. The node generates threads based on the commands in the command buffer.

Thread manager module 604, schedules execution of the code blocks in one or more processors of the graph streaming processor array (GSP) 606. Thread manager module 604 is coupled to the compiler, graph streaming processor array 606 and memory 608. For an embodiment, the thread manager module 604 includes a plurality of stages and a plurality of command buffers located between each of the plurality of stages, wherein each stage includes physical hardware operative to schedule each of the threads, including an input command buffer parser operative to interpret commands within a corresponding input command buffer and generate the plurality of threads. In an embodiment a portion of thread manager module 604 is implemented in hardware.

In a non-limiting example, memory 608 comprises a plurality of data buffers 614, command buffers 620, constants buffers 616 and code block buffers 618. Input command buffers 620, 624 store the index pointing to the data buffers 614. Index to the first input command buffer (620) connected to the compiler is provided by the compiler, subsequent indices are written by the graph streaming processor array. Stage 622 reads the command buffers 620 and schedules a thread in the graph streaming processor array 606 to execute instructions. The index to the data for execution of code by the processor array 606 is stored in command buffers 62. In some embodiments, command buffers 620 and 624 can also store pointer to code block buffers 618. Memory 608 may represent any suitable or desired information storage medium. Memory 608 may be coupled with processing array 606.

Data buffers 614, comprises of a plurality of buffers to store data for processing or for storing the results of processing. Data buffers 614 communicate with the graph streaming processor array 606. The index to the data buffer 614 is stored in the command buffer 620, 624. Code block buffer 618 stores the code blocks for execution by the processor array 606. In an embodiment, data buffers and command buffers are First in First out (FIFO) buffers, DRAM, MRAM or SRAM. Compiler 602 partitions the code and writes the code blocks in the code block buffer 618. The code block buffer 618 is read by the processor array 606 for execution. Compiler 602 stores constants required for code blocks in constants buffers 616. Processor array 606 reads the constants buffer 616 when required for execution of the code block. In some embodiments, constants buffer 616 is written by compiler 602 and read by GSP 606.

Figure 7:
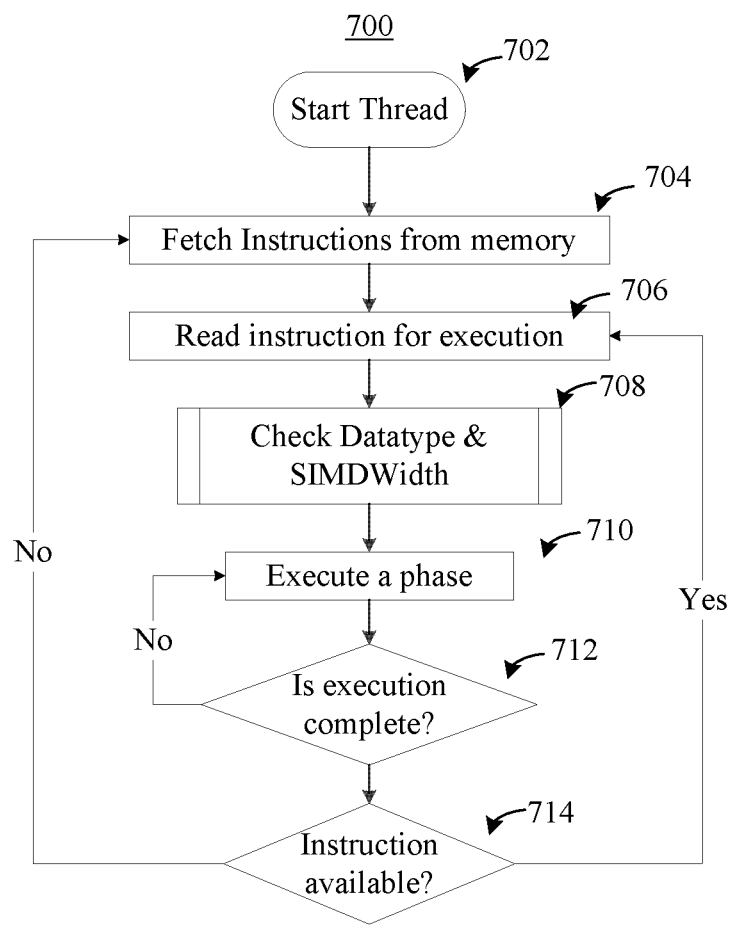
FIG. 7 is a method of implementing logical registers in an embodiment.

FIG. 7 is an example method 700 of efficiently managing logical registers in a GSP system. In step 702, compiler generates a SIMD thread and scheduler module 504 issues the SIMD thread to GSP array 506.

In step 704, instruction fetch module 110 initiates the fetch of a cache-line (64 bytes) of instructions from memory 102 via the instruction cache 106. The first cache line is stored in instruction storage module 114 when the second cache line is being fetched. Thus, the execution of one cache-line worth of instructions overlaps with the fetch of the second cache-line of instructions. In step 706, instructions are read for execution. In this step, thread arbiter module selects a thread that has instructions available, reads instructions from instruction storage module 114 and delivers the instructions to compute resources namely ALU 128, load 130, and store 132 via respective instruction iterators 118/120122. Thread arbiter module 116 routes the instructions that is fetched from memory to each compute resources ALU 128, load 130, and store 132. Each compute resource has an instruction iterator (118, 120, 122). Instruction iterator (118, 120, 122) determines the data type required for each instruction along with SIMD width in step 708. Instruction iterator iteratively executes the instruction by determining the number of clock phases required for executing each instruction based on the data type and the SIMD width.

ALU executes an instruction in the first clock phase in step 710 and checks if there are more clock phases required to complete the execution of the instruction on all the data in step 712, If there are more data to complete execution of the instruction then method loops back to step 710. If there are no more clock phases required to complete the instruction execution, then method 700 proceeds to step 714. In step 714, the thread arbiter module 117 checks if more instructions are available in instruction storage and loops to step 707 to read the next instruction. If there are no more instructions available in instructions storage module 114, method loops back to step 704 to fetch the next instruction.

Figure 8:
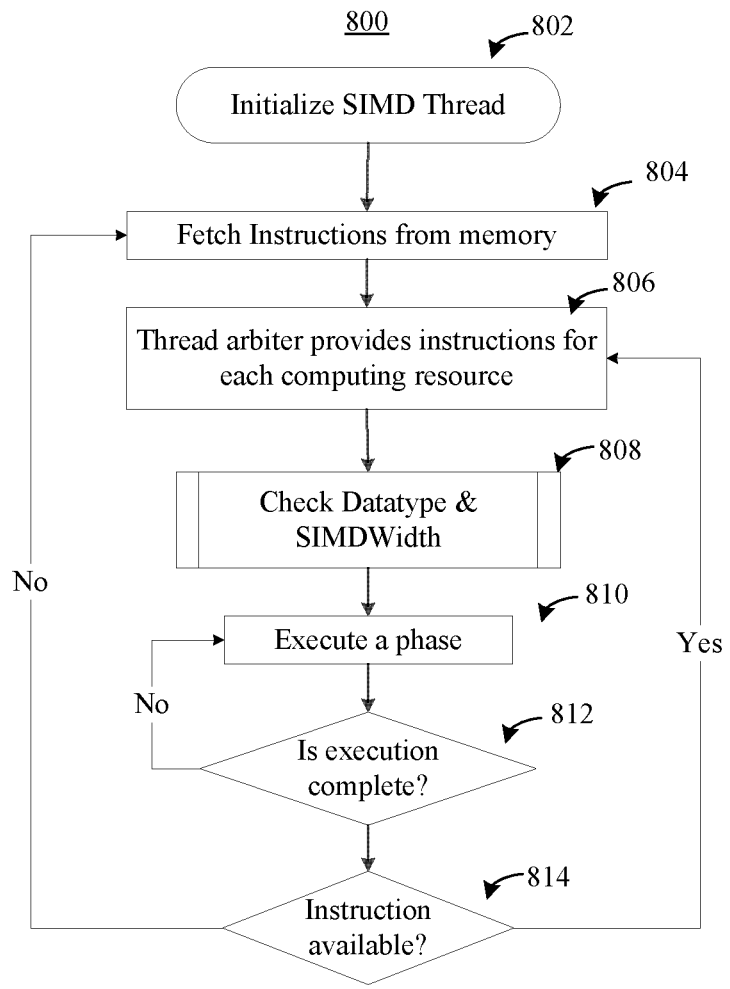
FIG. 8 is a method of implementing logical registers in a second embodiment.

FIG. 8 is an example method 800 of efficiently managing logical registers in a GSP system. In step 802, thread scheduler module 104 initiates the SIMD thread with an initial dispatch mask.

In step 804, instruction fetch module 110 initiates the fetch of a first cache-line (64 Bytes) of instructions from memory 102 via the instruction cache 106. The first cache line is stored in instruction storage module 114 when the second cache line is being fetched. Thus, the execution of one cache-line worth of instructions overlaps with the fetch of the second cache-line of instructions. Thread arbiter module selects a thread that has instructions available, reads instruction from instruction storage module 114 and provides the instruction for each compute resource Load, Store and Flow control in step 806.

Thread arbiter module 116 routes the instructions that is fetched from memory to each compute resources ALU 128, load 130, and store 132. Each compute resource has an instruction iterator (118, 120, 122).

Instruction iterator (118, 120, 122) determines the data type required for each instruction along with SIMD width in step 808. Instruction iterator iteratively executes the instruction in steps 810, 812 and 814, by determining the number of clock phases required for executing each instruction based on the data type and the SIMD width.

ALU 128 executes a first phase of the instruction in step 810 and checks if there are more clock phases required to complete the execution of the instruction on all the data in step 812, If there are more data to complete execution of the instruction then method loops back to step 810. If there are no more clock phases required to complete the instruction execution, then method 800 proceeds to step 814.

In step 814, the thread arbiter module 116 checks if any more instructions are available and loops to step 806 to read the next instruction. If there are no more instructions, the method loops to step 804 to fetch the next instruction from memory.

While certain example techniques have been described and shown herein using various methods or systems, it should be understood by those skilled in the art that various other modifications may be made, and equivalents may be substituted, without departing from claimed subject matter. Additionally, many modifications may be made to adapt a situation to the teachings of claimed subject matter without departing from the central concept described herein. Therefore, it is intended that claimed subject matter not be limited to examples disclosed, but that such claimed subject matter may also include all implementations falling within the scope of the appended claims, and equivalents thereof.

A method and system of a graph streaming processor comprising, initiating a Single Instruction Multiple Data (SIMD) thread by a thread scheduler wherein the SIMD thread includes a dispatch mask with an initial value; fetching instructions, by one or more processors from a memory; providing, by a thread arbiter module, an instruction of the instructions to each of one or more compute resources; determining, by an instruction iterator associated with the each of one or more compute resources a data type of the instruction; and iteratively executing, by the instruction iterator, the instruction based on the data type and the dispatch mask.

The method further determining by the instruction iterator based on the data type and a dispatch mask width, a number of clock phases for the iterative execution of the instruction. The method further comprising a register file, the register file including a Content Addressable Memory (CAM) and a plurality of memory banks, wherein the CAM maps a logical address to a physical address of the plurality of memory banks. The method further comprising, determining a number of memory locations in the register file based on the data type and a SIMD width, by the instruction iterator for the iterative execution. The CAM stores a SIMD thread ID associated with the SIMD thread, a register number and a sub-register number, wherein the register number indicates which of the plurality of memory banks, and the sub-register number indicates a memory location in the plurality of memory banks. The method wherein iteratively executing further comprises, selecting the memory location by the instruction iterator based on the data type and, the selecting the memory location further comprises comparing the SIMD thread ID and the register number in all locations in the CAM; and providing a matched returned sub-register number to select the memory location in the plurality of memory banks. The method comprises dispatch mask indicating which data channels of a plurality of data channels are enabled and/or indicates which data channels of the plurality of data channels are disabled. The instruction iterator processes data from a subset of the data channels of the plurality of data channels during iterative execution of instructions for the SIMD thread.

The invention claimed is:

1. A method comprising:
   initiating a Single Instruction Multiple Data (SIMD) thread by a thread scheduler, wherein the SIMD thread includes a dispatch mask with an initial value;
   fetching instructions, by one or more processors, from a memory;
   providing, by a thread arbiter module, an instruction of the instructions to each of one or more compute resources;
   determining, by an instruction iterator associated with the each of one or more compute resources a data type of the instruction, wherein the instruction operates on a logical register, wherein a size of the logical register is independent of the data type;
   and
   iteratively executing, by the instruction iterator, the instruction based on the data type and the dispatch mask;
   wherein the one or more processors map the logical register to a plurality of physical registers by introducing a sub-register number;
   wherein the plurality of physical registers are mapped to the logical register simultaneously at a given instance of time.

2. The method of claim 1, further determining by the instruction iterator based on the data type and a dispatch mask width of the dispatch mask, a number of clock phases for the iteratively execution of the instruction.

3. The method of claim 1, further comprising a register file, the register file including a Content Addressable Memory (CAM) and a plurality of memory banks, wherein the CAM maps a logical address to a physical address of the plurality of memory banks.

4. The method of claim 3, further comprising, determining a number of memory locations in the register file based on the data type and a SIMD width, by the instruction iterator for the iterative execution of the instruction.

5. The method of claim 3, wherein the CAM stores a SIMD thread ID associated with the SIMD thread, a register number and a sub-register number, wherein the register number indicates which of the plurality of memory banks, and the sub-register number indicates a memory location in the plurality of memory banks.

6. The method of claim 5, wherein the iterative execution further comprises, selecting the memory location by the instruction iterator based on the data type.

7. The method of claim 6, the selecting the memory location further comprises: comparing the SIMD thread ID and the register number in all locations in the CAM; and providing a matched returned sub-register number to select the memory location in the plurality of memory banks, based on the comparing of the SIMD thread ID and the register number.

8. The method of claim 1, wherein the dispatch mask indicates which data channels of a plurality of data channels are enabled and/or indicates which data channels of the plurality of data channels are disabled.

9. The method of claim 8, wherein the instruction iterator processes data from a subset of the data channels of the plurality of data channels during iterative execution of instructions for the SIMD thread.

10. A system operative to manage logical registers in a Graph Streaming Processor (GSP) system, comprising:
    a thread scheduler module operative to initiate a SIMD thread, the SIMD thread including a dispatch mask with an initial value;
    an instruction fetch module to fetch instructions from a memory;
    a thread arbiter module operative to select an instruction from the instructions and provide the instruction to each of one or more compute resources; and
    an instruction iterator module, associated with the each of one or more compute resources operative to determine a data type of the instruction; and wherein the instruction operates on a logical register, where in a size of the logical register is independent of the data type;

wherein the instruction iterator module iteratively executes the instruction based on the data type and the dispatch mask;

wherein the one or more processors map the logical register to a plurality of physical registers by introducing a sub-register number;

wherein the plurality of physical registers are mapped to the logical register simultaneously at a given instance of time.

11. The system of claim 10, the instruction fetch module initiates the instruction fetch from the memory via an instruction cache.

12. The system of claim 11, further comprising an instruction storage to store a first portion of the instruction when a second portion of the instruction is being fetched.

13. The system of claim 10, wherein the dispatch mask indicates which data channels of a plurality of data channels are enabled and/or indicates which data channels of the plurality of data channels are disabled.

14. The system of claim 13, wherein the instruction iterator processes data from a subset of the data channels of the plurality of data channels during iterative execution of instructions for the SIMD thread.

15. The system of claim 10, further comprising a register file to store variable data.

16. The system of claim 15, the register file further comprises a Content Addressable Memory (CAM) and a plurality of memory banks, wherein the CAM maps a logical address to a physical address of the plurality of memory banks.

17. The system of claim 16, wherein the CAM stores a SIMD thread ID associated with the SIMD thread, a register number and a sub-register number, wherein the register number indicates the address of the plurality memory banks and the sub-register number indicates a memory location in the plurality of memory banks.

18. The system of claim 17, wherein the instruction iterator module selects the memory location based on the data type.

19. The system of claim 17, the instruction iterator compares the SIMD thread ID and the register number in all locations in the CAM; and returns the sub-register number of a matched SIMD thread ID and the register number to the instruction iterator;

selects the memory location that matches the sub-register number.

\* \* \* \* \*